April 15, 1930.  H. D. CROFT  1,755,102

GEAR

Filed June 9, 1927

Hiram D. Croft  INVENTOR.

Patented Apr. 15, 1930

1,755,102

UNITED STATES PATENT OFFICE

HIRAM D. CROFT, OF SPRINGFIELD, MASSACHUSETTS, ASSIGNOR TO PERKINS MACHINE AND GEAR COMPANY, OF SPRINGFIELD, MASSACHUSETTS, A CORPORATION OF MASSACHUSETTS

GEAR

Application filed June 9, 1927. Serial No. 197,738.

My invention relates to improvements in gears of the crown-gear type, and consists of a gear so constructed that the plane through which the action takes place on each tooth is approximately at right-angles to the axis of said gear, and is intersected by the plane of the associated tooth angle, instead of coinciding with the same as in the ordinary crown gear, said second-named plane being approximately parallel with the bottom of the recess between any given tooth and the next tooth, all as hereinafter set forth.

The primary object of my invention is to produce a gear which, while it approximates a crown gear, can be manufactured much more cheaply than the true crown gear, because the teeth of my gear can be and preferably are made with a form cutter, instead of being generated with the aid of expensive and complicated mechanism such as is required in the production of ordinary crown gears.

This gear is capable of intermeshing and especially adapted to intermesh with a spur gear, and is designed more particularly for that purpose, taking the place of the more expensive, generated crown gear.

Other objects and advantages will be apparent from the following description.

I attain the objects and secure the advantages of my invention by the means illustrated in the accompanying drawings, in which—

Figure 1:
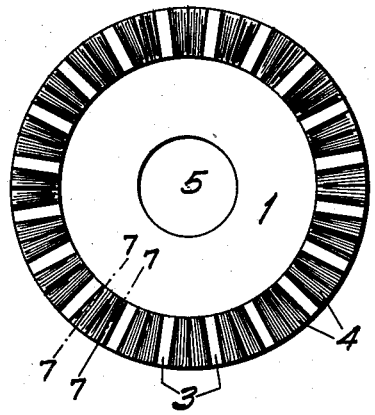
Figure 2:
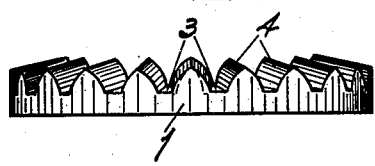
Figure 3:
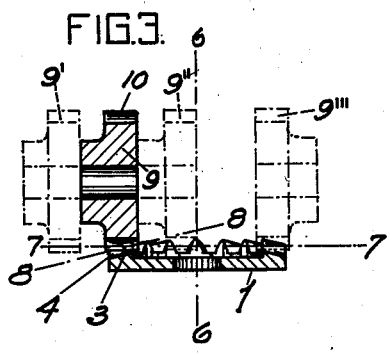

Figure 1 is a plan of a gear which embodies a practical form of my invention; Fig. 2, a side elevation of said gear; Fig. 3, a side elevation in partial section of said gear, on a reduced scale, showing the same in engagement with a spur gear, and in dotted lines illustrating different positions of said spur gear relative to said first-named gear, and also a second spur gear, and, Fig. 4, a greatly enlarged, sectional detail at the place of engagement between the two gears shown in full lines in Fig. 3.

Similar reference characters designate similar reference parts throughout the several views.

The gear illustrated in connection herewith comprises a body 1 having on one side at the periphery an annular, raised part or flange 2, recesses 3 being cut in said flange to form radial teeth 4. The teeth 4 are of peculiar construction, as explained in detail below. In the axial center of the body 1 is an opening 5 as usual, for the reception of a shaft or other member on which the gear is to be mounted.

Figure 4:
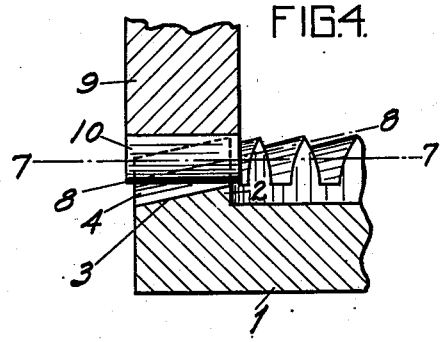

In Fig. 3, the axis of the gear is represented by broken lines 6—6; in each of Figs. 3 and 4, the plane through which the action takes place is represented by broken lines 7—7, and two such lines appear in Fig. 1; and, in each of Figs. 3 and 4, the path of the cutter with which the teeth are cut, or the tooth angle is represented by broken lines 8—8. It is to be observed that the plane between the two lines 7—7 in Fig. 1, passes through each tooth 4 from a point approximately intermediate of the depth of said tooth at the inner end to a point approximately at the top of said tooth at the outer end; that said plane is at right-angles to the axis (6—6) of the gear; and that the plane, indicated at 8—8 and which represents the angle of the path of the cutter that forms said tooth, intersects said first-named plane, the intersection as shown herein being at said inner end of the tooth.

In the present example, each recess 3, at the bases of any two adjacent teeth 4, has parallel sides, and each tooth is narrower at the base at the inner end than it is at the base at the outer end of the tooth. The crown of each tooth is in a line radial to the center of the gear, and is the only exterior portion of the tooth that is radial to said center. From the aforesaid crown line of the tooth the sides of said tooth curve downwardly and relatively divergently to the base side lines of the tooth, substantially. Thus it is seen that each tooth 4 has a downward inclination from the inner to the outer end, and is narrower at the inner than at the outer end at the base, all of which facilitates the engaging and disengaging or shifting operations, and at the same time has its plane through which the action takes place, the same being that on which relative motion occurs between the teeth of this gear and those of an intermeshing gear, so located as to enable the first gear to operate successfully when intermeshed with the second gear, the latter usually being of the spur-gear type.

The sides of each tooth 4 are simple, as distinguished from compound or involute, curves, as illustrated in connection herewith, although there might be some departure from this.

These teeth can be, and in practice are, cut with an ordinary form cutter inclined at the proper angle (8—8), consequently gears of which said teeth constitute integral parts are capable of being produced in large numbers at a comparatively small cost. By setting the form cutter at an angle to the plane through which the action takes place, a tooth form is cut thereby and created which approximates sufficiently closely the truly generated teeth of a crown gear to enable the new gear to be used successfully in a great many cases where otherwise it would be necessary to supply said crown gear. Each recess 3 is, of course, of the same size and shape as the size and shape of that portion of the form cutter with which the recesses are cut and the teeth 4 made.

In Fig. 3 a spur gear 9 is shown in engagement with the new gear, and in Fig. 4 fragmentary portions of said gears are illustrated on a sufficiently large scale to disclose clearly how the teeth of the two gears intermesh. The spur-gear teeth are indicated at 10.

The spur gear 9 is shown by full lines in engagement with the new gear, and by broken lines at 9' in disengaged position or outside of the other gear, and by broken lines at 9" in disengaged position inwardly relative to the other gear, while by broken lines at 9''' a second spur gear is represented in engagement with the other gear on the side opposite to that where the first spur gear is in engagement therewith. I have thus shown how a spur gear is driven by the new gear, and how it can be shifted on its axis into and out of engagement with said last-named gear; also how two gears may be used in connection with the other and thereby driven in opposite directions. Like the spur gear 9 the spur gear 9''' can be shifted in either direction, to engage and disengage it with and from the new gear.

The teeth 4 and the teeth 10, when the two gears of which said teeth respectively constitute integral parts are in motion, form or make with each other by a rolling motion progressive contacts through the plane represented at 7—7.

This gear may be varied in shape and size, and in various structural details in addition to those hereinbefore mentioned, without departing from the spirit of my invention, or exceeding the scope of what is claimed.

What I claim as my invention, and desire to secure by Letters Patent, is—

1. As an improved article of manufacture, a gear comprising a body and side teeth, each of said teeth being so constructed that its pitch line on which the action takes place (as line 7—7) is at right-angles to the axis of the gear, the tooth throughout said line is approximately equal in width, and the tooth on the addendum side of said line gradually becomes less in height as the outer end of the tooth is approached, and on the dedendum side increases in depth.

2. As an improved article of manufacture, a gear comprising a body and side teeth with the recesses between said teeth conforming in shape and size to the shape and size of the cutting portions of a form cutter capable of cutting with a single pass any one of said recesses, said pass being angular to the line of action (as line 8—8 to line 7—7), each of said teeth being so constructed that its pitch line or line of action (as line 7—7) is at right-angles to the axis of the gear, the tooth throughout said line is approximately equal in width, and the tooth on the addendum side of said line gradually becomes less in depth as the outer end of the tooth is approached, and on the dedendum side increases in depth.

HIRAM D. CROFT.